United States Patent
Kahlich et al.

(10) Patent No.: US 9,965,274 B2
(45) Date of Patent: May 8, 2018

(54) COMPUTER PROCESSOR EMPLOYING BYPASS NETWORK USING RESULT TAGS FOR ROUTING RESULT OPERANDS

(71) Applicant: Mill Computing, Inc., Palo Alto, CA (US)

(72) Inventors: Arthur David Kahlich, Sunnyvale, CA (US); Roger Rawson Godard, East Palo Alto, CA (US)

(73) Assignee: Mill Computing, Inc., Palo Alto, CA (US)

( * ) Notice: Subject to any disclaimer, the term of this patent is extended or adjusted under 35 U.S.C. 154(b) by 185 days.

(21) Appl. No.: 14/515,248

(22) Filed: Oct. 15, 2014

(65) Prior Publication Data

US 2015/0106598 A1     Apr. 16, 2015

Related U.S. Application Data

(60) Provisional application No. 61/890,891, filed on Oct. 15, 2013.

(51) Int. Cl.

| | |
|---|---|
| *G06F 12/1045* | (2016.01) |
| *G06F 12/1027* | (2016.01) |
| *G06F 12/02* | (2006.01) |
| *G06F 12/0864* | (2016.01) |
| *G06F 12/0811* | (2016.01) |

(Continued)

(52) U.S. Cl.
CPC ...... *G06F 9/30032* (2013.01); *G06F 9/30145* (2013.01); *G06F 9/3826* (2013.01); *G06F 9/3828* (2013.01); *G06F 12/0292* (2013.01); *G06F 12/0811* (2013.01); *G06F 12/0864* (2013.01); *G06F 12/0893* (2013.01); *G06F 12/1027* (2013.01); *G06F 12/1045* (2013.01); *G06F 12/0897* (2013.01); *G06F 12/1009* (2013.01); *G06F 17/30286* (2013.01); *G06F 2212/1024* (2013.01); *G06F 2212/1028* (2013.01); *G06F 2212/283* (2013.01); *G06F 2212/608* (2013.01); *G06F 2212/6032* (2013.04); *G06F 2212/684* (2013.01); *Y02B 60/1225* (2013.01)

(58) Field of Classification Search
CPC ............................ G06F 9/3826; G06F 9/3828
See application file for complete search history.

(56) References Cited

U.S. PATENT DOCUMENTS

| | | |
|---|---|---|
| 5,111,431 A | 5/1992 | Garde |
| 5,954,811 A | 9/1999 | Garde |

(Continued)

OTHER PUBLICATIONS

Tariq Jamil, RAM versus CAM, 1997, IEEE, 0278-6648/97, 4 pages.*

(Continued)

*Primary Examiner* — Jyoti Mehta
(74) *Attorney, Agent, or Firm* — Gordon & Jacobson, P.C.

(57) ABSTRACT

A computer processor is provided with a plurality of functional units that performs operations specified by the at least one instruction over the multiple machine cycles, wherein the operations produce result operands. The processor also includes circuitry that generates result tags dynamically according to the number of operations that produce result operands in a given machine cycle. A bypass network is configured to provide data paths for transfer of operand data between the plurality of functional units according to the result tags.

10 Claims, 3 Drawing Sheets

(51) Int. Cl.
*G06F 12/0893* (2016.01)
*G06F 9/30* (2018.01)
*G06F 9/38* (2018.01)
G06F 12/1009 (2016.01)
G06F 17/30 (2006.01)
G06F 12/0897 (2016.01)

(56) References Cited

U.S. PATENT DOCUMENTS 6,128,721 A * 10/2000 Yung .................... G06F 9/3012
712/23
8,095,780 B2 1/2012 Leijten

OTHER PUBLICATIONS

Register File Characterization, Nov. 28, 2004, 19 pages, [retrieved from the internet on Feb. 3, 2016], retrieved from URL <www.ecse.rpi.edu/frisc/theses/CampbellThesis/chapter3.html>.*

* cited by examiner

Fetch ⟶ Decode ⟶ Issue ⟶ Execute ⟶ Retire

COMPUTER PROCESSOR EMPLOYING BYPASS NETWORK USING RESULT TAGS FOR ROUTING RESULT OPERANDS

CROSS-REFERENCE TO RELATED APPLICATIONS

The present disclosure claims priority from U.S. Provisional Patent Appl. No. 61/890,891, filed on Oct. 15, 2013, entitled "Cache Support for a Computer Processor," herein incorporated by reference in its entirety.

BACKGROUND

1. Field

The present disclosure relates to computer processing systems.

2. State of the Art

A computer processor (and the program which it executes) performs operations (such as ADD, MULTIPLY, etc.) that transforms source data (argument operands) into result data (result operands). Operations can accept one or more arguments and yield one or more results. Operations are encoded by instructions. Each instruction can encode one or several operations. The result operands of operations in a particular instruction can be selectable as argument operands by one or more operations in following instructions. In modern computer processors, a bypass network routes result operands produced by the execution of one or more preceding instructions to the appropriate inputs of the functional units of the processor for use as argument inputs in subsequent operations performed by the functional units.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processor with a plurality of functional units that performs operations specified by the at least one instruction over the multiple machine cycles, wherein the operations produce result operands. The computer processor also includes circuitry that generates result tags dynamically according to the number of operations that produce result operands in a given machine cycle. A bypass network that provides data paths for transfer of result operands between the plurality of functional units according to said result tags.

Additional features of the bypass network are disclosed.

DETAILED DESCRIPTION OF THE PREFERRED EMBODIMENTS

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, store or branch operation.

The term "instruction" is a unit of logical encoding including zero or more operations. For the case where an instruction includes multiple operations, the multiple operations are semantically performed together.

The term "hierarchical memory system" is a computer memory system storing instructions and operand data for access by a processor in executing a program where the memory is logically organized in a hierarchical arrangement of levels of memory with increasing access latency from the top level of memory closest to the processor to the bottom level of memory furthest away from the processor.

The term "cache line" or "cache block" is a unit of memory that is accessed by a computer processor. The cache line includes a number of bytes (typically 4 to 128 bytes).

Figures 1, 2:
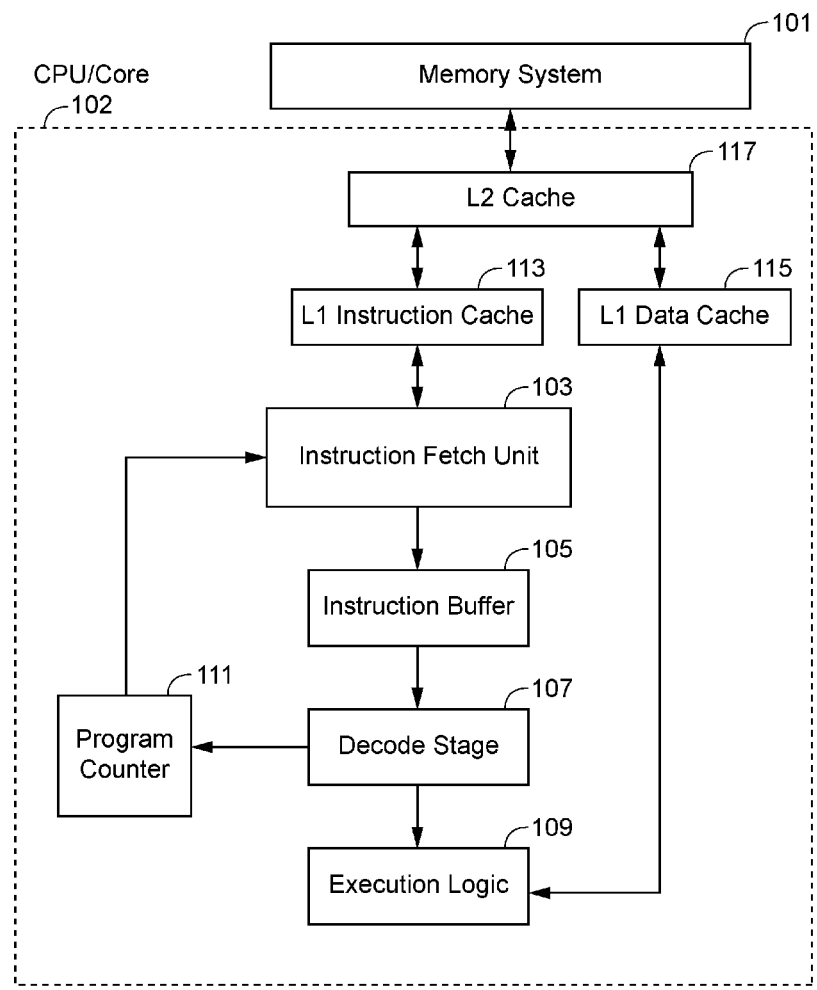
FIG. 1 is a schematic block diagram of a computer processing system according to an embodiment of the present disclosure.
FIG. 2 is a schematic diagram of exemplary pipeline of processing stages that can be embodiment by the computer processor of FIG. 1.

In accordance with the present disclosure, a sequence of instructions is stored in a hierarchical memory system 101 and processed by a CPU (or Core) 102 as shown in the exemplary embodiment of FIG. 1. The CPU (or Core) 102 includes a number of instruction processing stages including at least one instruction fetch unit (one shown as 103), at least one instruction buffer or queue (one shown as 105), at least one decode stage (one shown as 107) and execution logic 109 that are arranged in a pipeline manner as shown. The CPU (or Core) 102 also includes at least one program counter (one shown as 111), at least one L1 instruction cache (one shown as 113), an L1 data cache 115 and a shared instruction/data L2 Cache 117.

The L1 instruction cache 113, the L1 data cache 115 and the L2 cache are logically part of the hierarchical memory system 101. The L1 instruction cache 113 is a cache memory that stores copies of instruction portions stored in the memory system 101 in order to reduce the latency (i.e., the average time) for accessing the instruction portions stored in the memory system 101. In order to reduce such latency, the L1 instruction cache 113 can take advantage of two types of memory localities, including temporal locality (meaning that the same instruction will often be accessed again soon) and spatial locality (meaning that the next memory access for instructions is often very close to the last memory access or recent memory accesses for instructions). The L1 instruction cache 113 can be organized as a set-associative cache structure, a fully associative cache structure, or a direct mapped cache structure as is well known in the art. Similarly, the L1 data cache 115 is a cache memory that stores copies of operands stored in the memory system 101 in order to reduce the latency (i.e., the average time) for accessing the operands stored in the memory system 101. In order to reduce such latency, the L1 data cache 115 can take advantage of two types of memory localities, including temporal locality (meaning that the same operand will often be accessed again soon) and spatial locality (meaning that the next memory access for operands is often very close to the last memory access or recent memory accesses for operands). The L1 data cache 115 can be organized as a set-associative cache structure, a fully associative cache structure, or a direct mapped cache structure as is well known in the art. The shared L2 Cache 117 stores both instructions and data. The L2 cache 117 can be organized as a set-associative cache structure, a fully associative cache structure, or a direct mapped cache structure as is well known in the art. The hierarchy of the memory system 201 can also include additional levels of cache memory, such as a level 3 cache, as well as main memory. One or more of these additional levels of the cache memory can be integrated with the CPU 102 as is well known. The details of the organization of the memory hierarchy are not particularly relevant to the present disclosure and thus are omitted from the figures of the present disclosure for sake of simplicity.

The program counter 111 stores the memory address for a particular instruction and thus indicates where the instruction processing stages are in processing the sequence of instructions. The memory address stored in the program counter 111 can be used to control the fetching of the instructions by the instruction fetch unit 103. Specifically, the program counter 111 can store the memory address for the instruction to fetch. This memory address can be derived from a predicted (or resolved) target address of a control-flow operation (branch or CALL operation), the saved address in the case of a RETURN operation, or the sum of memory address of the previous instruction and the length of previous instruction. The memory address stored in the program counter 111 can be logically partitioned into a number of high-order bits representing a cache line address ($ Cache Line) and a number of low-order bits representing a byte offset within the cache line for the instruction.

The instruction fetch unit 103, when activated, sends a request to the L1 instruction cache 113 to fetch a cache line from the L1 instruction cache 113 at a specified cache line address ($ Cache Line). This cache line address can be derived from the high-order bits of the program counter 111. The L1 instruction cache 113 services this request (possibly accessing lower levels of the memory system 101 if missed in the L1 instruction cache 113), and supplies the requested cache line to the instruction fetch unit 103. The instruction fetch unit 103 passes the cache line returned from the L1 instruction cache 113 to the instruction buffer 105 for storage therein.

The decode stage 107 is configured to decode one or more instructions stored in the instruction buffer 105. Such decoding generally involves parsing and decoding the bits of the instruction to determine the type of operation(s) encoded by the instruction and generate control signals required for execution of the operation(s) encoded by the instruction by the execution logic 109.

The execution logic 109 utilizes the results of the decode stage 107 to execute the operation(s) encoded by the instructions. The execution logic 109 can send a load request to the L1 data cache 115 to fetch data from the L1 data cache 115 at a specified memory address. The L1 data cache 115 services this load request (possibly accessing the L2 cache 117 and lower levels of the memory system 101 if missed in the L1 data cache 115), and supplies the requested data to the execution logic 109. The execution logic 109 can also send a store request to the L1 data cache 115 to store data into the memory system at a specified address. The L1 data cache 115 services this store request by storing such data at the specified address (which possibly involves overwriting data stored by the data cache and lowering the stored data to the L2 Cache 117 and lower levels of the hierarchical memory system).

The instruction processing stages of the CPU (or Core) 102 can achieve high performance by processing each instruction and its associated operation(s) as a sequence of stages each being executable in parallel with the other stages. Such a technique is called "pipelining." An instruction and its associated operation(s) can be processed in five stages, namely, fetch, decode, issue, execute and retire as shown in FIG. 2.

In the fetch stage, the instruction fetch unit 103 sends a request to the L1 instruction cache 113 to fetch a cache line from the L1 instruction cache 113 at a specified cache line address ($ Cache Line). The instruction fetch unit 103 passes the cache line returned from the L1 instruction cache 113 to the instruction buffer 105 for storage therein.

The decode stage 107 decodes one or more instructions stored in the instruction buffer 107. Such decoding generally involves parsing and decoding the bits of the instruction to determine the type of operation(s) encoded by the instruction and generating control signals required for execution of the operation(s) encoded by the instruction by the execution logic 109.

In the issue stage, one or more operations as decoded by the decode stage are issued to the execution logic 109 and begin execution.

In the execute stage, issued operations are executed by the functional units of the execution logic 109 of the CPU/Core 102.

In the retire stage, the results of one or more operations produced by the execution logic 109 are stored by the CPU/Core 102 as transient result operands for use by one or more other operations in subsequent issue/execute cycles.

The execution logic 109 includes a number of functional units (FUs) which perform primitive steps such as adding two numbers, moving data from the CPU proper to and from locations outside the CPU such as the memory hierarchy, and holding operands for later use, all as are well known in the art. Also within the execution logic 109 is a connection fabric or interconnect network connected to the FUs so that data produced by a producer (source) FU can be passed to a consumer (sink) FU for further storage or operations. The FUs and the interconnect network of the execution/retire logic 109 are controlled by the executing program to accomplish the program aims.

During the execution of an operation by the execution logic 109 in the execution stage, the functional units can access and/or consume transient operands that have been stored by the retire stage of the CPU/Core 102. Note that some operations take longer to finish execution than others. The duration of execution, in machine cycles, is the execution latency of an operation. Thus, the retire stage of an operation can be latency cycles after the issue stage of the operation. Note that operations that have issued but not yet completed execution and retired are "in-flight." Occasionally, the CPU/Core 102 can stall for a few cycles. Nothing issues or retires during a stall and in-flight operations remain in-flight.

Figure 3:
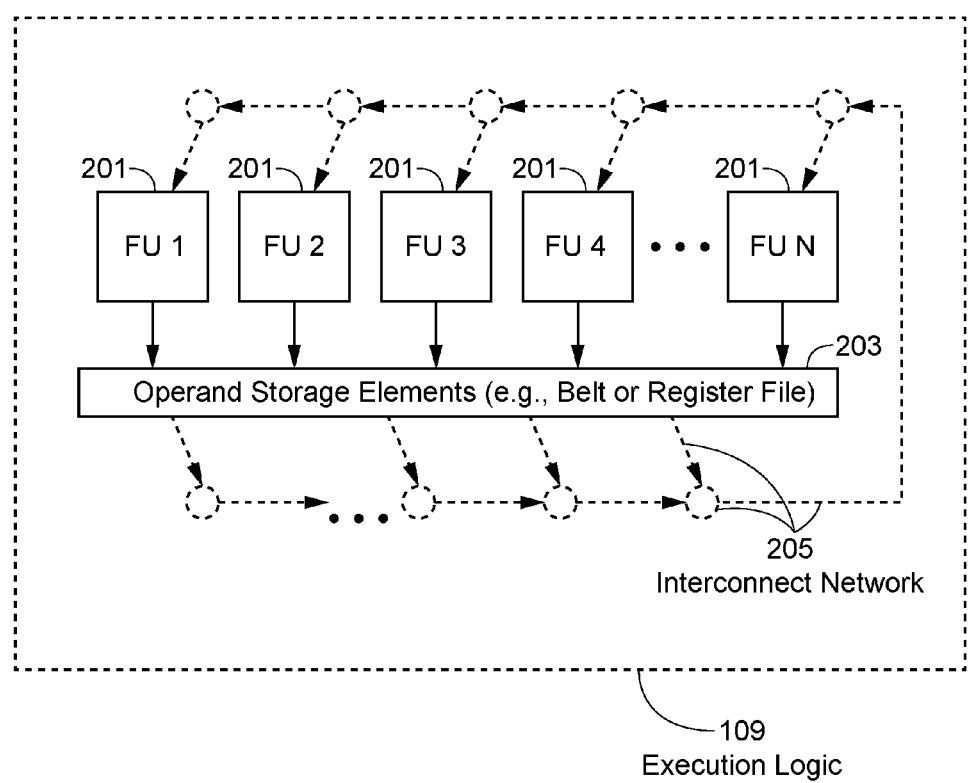
FIG. 3 is schematic illustration of components that can be part of the execution logic of the computer processor of FIG. 1 according to an embodiment of the present disclosure.

FIG. 3 is a schematic diagram illustrating the architecture of an illustrative embodiment of the execution logic 109 of the CPU/Core 102 of FIG. 1 according to the present disclosure, including a number of functional units 201. The execution logic 109 also includes a set of operand storage elements 203 that are operably coupled to the functional units 201 of the execution logic 109 and configured to store transient operands that are produced and referenced by the functional units of the execution logic 109. An interconnect network 205 provides a physical data path from the operand storage elements 203 to the functional units that can possibly consume the operand stored in the operand storage elements. The interconnect network 205 can also provide the functionality of a bypass routing circuit (directly from a producer functional unit to a consumer function unit).

Figure 4:
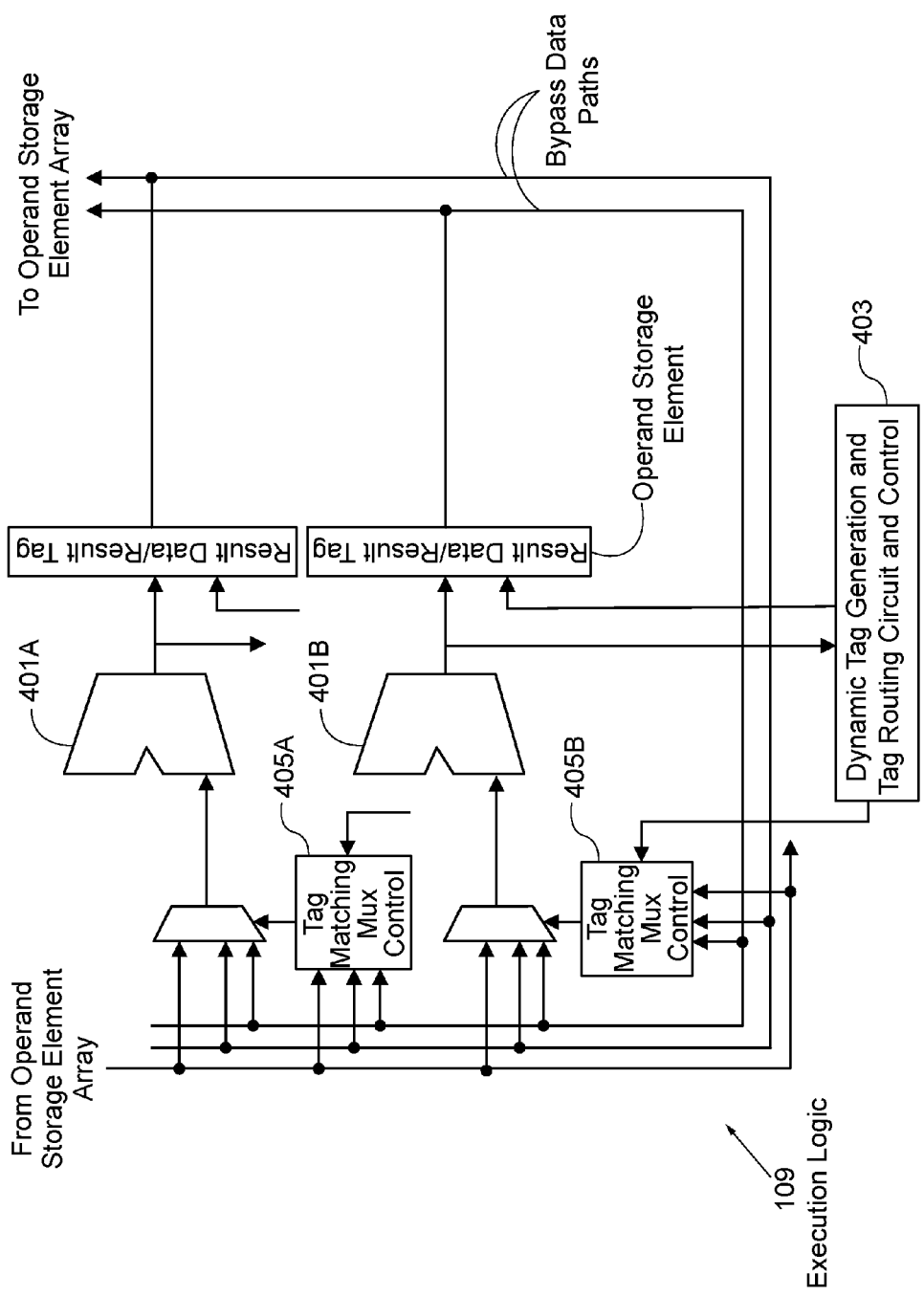
FIG. 4 is schematic illustration of a bypass network as part of the execution logic of the computer processor of FIG. 1 according to an exemplary embodiment of the present disclosure.

FIG. 4 is schematic illustration of a bypass network as part of the execution logic of the computer processor of FIG. 1 according to an exemplary embodiment of the present disclosure. More specifically, the execution logic 109 includes a number of functional units (for example, two show as 401A and 401B that perform operations that transform source data (argument operands) into result data (result operands). Operations can accept one or more argument operands as inputs and yield one or more result operands as output. The execution logic 10 also includes a circuit 403 that is configured to dynamically generate operand result tags (or result tags) that are associated with the result data that is produced by the functional units over the machine cycles of execution of the execution logic 109. The results tags are numeric values that refer to the result operands produced by the functional units in executing operations. Thus, a particular result tag refers to a particular result operand produced by a functional unit in executing an operation (or possibly a sequence of operations).

The circuit 403 can dynamically generate operand result tags and associate (assign) the result tags to particular result data in a variety of ways. For example, an operand tag can be a derived single value that stays constant while referring to the same result data until either the result data or the result tag is no longer valid. At this time, the operand tag can be used to refer to different operand result data. In this case, operand tags can be values that are selected from a set of possible values that are reused.

In one embodiment, the functional units of the execution logic 109 can be organized as multiple slots where a single slot can execute operations of mixed latency while retaining the ability to issue one of many supported operations each cycle. As a consequence, it is possible for a single slot to produce the results of several operations in the same cycle. For example, if a three-cycle operation is issued in cycle zero, a two-cycle operation in cycle one, and a one-cycle operation in cycle two, then all three operations will produce their results in cycle three. To keep the results from colliding, separate output registers can be provided for each operation latency present on the slot, and operations employ data paths to steer their results to the output register appropriate for the latency of the operation. In this configuration, each one of the output registers produces result data for the given slot result data from the view of the bypass network. Specifics of this organization are described in U.S. patent application Ser. No. 14/312,274, filed on Jun. 23, 2014, herein incorporated by reference in its entirety. In this embodiment, the slots are assigned numbers and all result data produced by the slots includes a valid bit that indicates the corresponding result data is valid output. Each new result data (result operand) that is produced by the functional units in a particular machine cycle is assigned a result tag value by adding the valid bits for all of the lower numbered slots and lower latency slot outputs that produce valid result data during this machine cycle to an initial value (which begins at zero). In this manner, the result operands that are produced in a given machine cycle are assigned different result tag values. For each valid result tag, an increment circuit is incremented by the number of result operands generated in each machine cycle to provide the initial value for generating the values of the operand result tags in the subsequent machine cycle. The predictable nature of the assignments allows compiler code generation logic tracking the result tag values to be similar in nature to a standard register allocation scheme.

In another embodiment, the circuit 403 can dynamically generate operand result tags and associate (assign) the result tags to particular result data by generating unique operand tag values for each operand produced during a given machine cycle for a group of result operands. One way this could be done is by assigning each operand a tag value starting at zero and incrementing monotonically for each additional operand that produces result operands during that same machine cycle.

In yet another embodiment, the circuit 403 can dynamically generate operand result tags and associate (assign) the result tags to particular result data by generating new unique operand tag values for each operand it retains in storage. Result operands that have already been produced the functional units in a given machine cycle can have their result tags incremented by the number of operands that are subsequently produced in the given machine cycle. If the operand result tag value is incremented beyond the maximum result tag value, the operand result tag is no longer valid.

The circuit 403 also performs routing of the results tag generated in a given machine cycle to appropriate tag match mux control circuits 405A and 405B as shown. The operand tags (each with a valid bit) and the corresponding result data as produced by the functional units are broadcast together over the bypass data paths for supply as inputs to the appropriate functional units (or for storage in an operand storage element array, such as a register file or belt).

The tag match mux control circuits 405A, 405B are selector circuits for inputs to a corresponding functional unit. Each respective tag match mux control circuits 405A, 405B includes a result tag comparator for each result output that can possibly be carried on the bypass data paths. The result tag comparator compares the operand result tag value carried on the bypass data path to the operand tag value to be selected as forwarded on by the circuit 403. If the output of the result tag comparator indicates that the operand result tag value carried on the bypass data path matches the operand tag value to be selected as forwarded on by the circuit 403 (possibly the operand result tag value carried on the bypass data path is signaled to be valid), then the corresponding result data carried on the bypass data paths is selected and routed as a valid input to the corresponding functional unit. This embodiment may or may not require only one result tag to match the operand tag value to be selected as forwarded on by the circuit 403. This embodiment may also contain logic to detect that no valid match (or multiple valid matches) exist between any result tag value carried on the bypass data paths and the operand tag value to be selected as forwarded on by the circuit 403 during a particular machine cycle, and this logic may signal either or both of these conditions as a fault. The operation of the tag match mux control circuits 405A, 405B can be used to steer result operand to appropriate functional units according to the execution of the program.

In this manner, the tag match mux control circuits 405A, 405B can be configured to receive from the operation field of the instruction a result tag to be used as a source for the operation as carried out by the corresponding functional unit. This singular result tag from the operation field is then compared simultaneously with all of the result tags carried on the bypass data paths for a match. There may be only zero or one match. The mux is constructed such that it has a select control input for each bypass result location, where at most only one select control input may be true at any time.

Furthermore, the tag match mux control circuits 405A, 405B are controlled by the current state of the tag valid signal that is part of the result tag carried on the bypass data paths. In generating the result tags, valid tags can be incremented by the number of results arriving at any one time. If the tag is not valid, then the tag is only made valid when there is a valid result arriving and the value is determined by the result within the operation (operations may have multiple results) and the position of the operation within the instruction. When the tag is valid, the overflow determines whether the future tag value is valid or not. If overflow, then set the tag valid to false, otherwise the tag value stays true.

In another embodiment, a plurality of signals are associated with each possible valid result tag value. These signals are the selected values of either a variable synchronous shift register or computation circuit results. In this embodiment each result selection circuit does not contain a set of tag comparators for each selector input. Instead, the desired operand tag is used to drive a binary addressed selector. The advantage of this embodiment may be a reduced number of wires carrying results to each result consuming circuit, thereby decreasing selection circuit delay and possibly reducing the space required for interconnect. The disadvantage of this embodiment may be an increase in the circuit delay required to generate the plurality of signals corresponding to each possible valid result tag value.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the microarchitecture and memory organization of the CPU 101 as described herein is for illustrative purposes only. A wide variety of CPU microarchitectures can embody the improvement and methods described herein, including microarchitectures that employ in-order execution, microarchitectures that employ out-of-order execution, superscalar microarchitectures, VLIW microarchitectures, single-core microarchitectures, multi-core microarchitectures, and combinations thereof. In another example, the functionality of the CPU 101 as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:

1. A computer processor comprising:
   a plurality of functional units that perform operations over multiple machine cycles, wherein the operations produce result operands;
   circuitry that generates result tags dynamically according to a number of result operands produced by the plurality of functional units in a given machine cycle;
   a bypass network that provides data paths for transfer of result operands between the plurality of functional units, wherein result tags and corresponding result operands are broadcast together over the data paths of the bypass network; and
   a plurality of selector circuits associated with the plurality of functional units, wherein each selector circuit is configured to selectively route a result operand carried on a given data path of the bypass network as an input to an associated functional unit based on operation of a result tag comparator that compares a result tag carried on the given data path of the bypass network to a dynamically selected result tag;
   wherein the plurality of selector circuits is controlled by tag valid signals that are part of the result tags generated dynamically according to the number of result operands and carried on the data paths of the bypass network.

2. A computer processor according to claim 1, wherein:
   the dynamically selected result tag corresponds to the result operand that is to be used as an input by the associated functional unit.

3. A computer processor according to claim 1, wherein:
   a tag valid signal of a particular result tag generated dynamically according to the number of result operands is based upon a corresponding result operand being determined by an operation.

4. A computer processor according to claim 1, wherein:
   a tag valid signal of a particular result tag generated dynamically according to the number of result operands is based upon position of an operation within an instruction.

5. A computer processor according to claim 1, wherein:
   a tag valid signal of a particular result tag generated dynamically according to the number of result operands is based upon an overflow condition.

6. A computer processor according to claim 1, wherein:
   the result tags generated dynamically according to the number of result operands are generated by incrementing result tag values in accordance with a number of result operands generated in the current machine cycle.

7. A computer processor according to claim 1, wherein:
   the result tags generated dynamically according to the number of result operands are generated by an incrementor circuit that is incremented by a number of result operands generated in each machine cycle to provide an initial value for operand result tags in a subsequent machine cycle.

8. A computer processor according to claim 1, wherein:
   the result tags generated dynamically according to the number of result operands each have a value constrained by a maximum tag value.

9. A computer processor according to claim 1, wherein:
   the result tags generated dynamically according to the number of result operands are based on an ordering of operations that produce the result operands in the given machine cycle.

10. A computer processor according to claim 1, wherein:
    the result tags generated dynamically according to the number of result operands are based on latency of operations that produce the result operands in the given machine cycle.

* * * * *